United States Patent [19]

David

[11] Patent Number: 4,703,353
[45] Date of Patent: Oct. 27, 1987

[54] SIGNAL INTERPOLATORS

[75] Inventor: Morgan W. A. David, Surrey, United Kingdom

[73] Assignee: Sony Corporation, Tokyo, Japan

[21] Appl. No.: 921,234

[22] Filed: Oct. 21, 1986

[30] Foreign Application Priority Data

Oct. 21, 1985 [GB] United Kingdom ............... 8525926

[51] Int. Cl.$^4$ .............................................. H04N 7/01
[52] U.S. Cl. .................................... 358/140; 358/138;
358/160; 382/47
[58] Field of Search ............... 358/140, 138, 133, 160;
382/56, 44, 47

[56] References Cited

U.S. PATENT DOCUMENTS

| 4,603,348 | 7/1986 | Yamada | 382/56 |
| 4,603,350 | 7/1986 | Arbeiter | 358/140 |
| 4,636,857 | 1/1987 | Achiha | 358/140 |
| 4,642,689 | 2/1987 | Demmer | 358/138 |

Primary Examiner—Howard W. Britton
Attorney, Agent, or Firm—Lewis H. Eslinger; Alvin Sinderbrand

[57] ABSTRACT

A signal interpolator for time base expanding a portion of an input sample signal of given sample rate by deriving, from the input sample values, interpolated output sample values at that sample rate, the signal interpolator comprising an address generator comprising an address counter for supplying a sequence of initial sample position addresses at that sample rate and corresponding to input sample values in the input sample signal, and a device for deriving, from the initial addresses, a modified sequence of sample position addresses at that sample rate, the modified sequence containing address repetitions corresponding to the required degree of expansion, and also for deriving residual signals corresponding to subdivisions of the intervals between successive different addresses in the modified sequence, and an interpolator for deriving each interpolated output sample value in dependence on the value of the residual signal and of a respective corresponding group of the input sample values.

7 Claims, 4 Drawing Figures

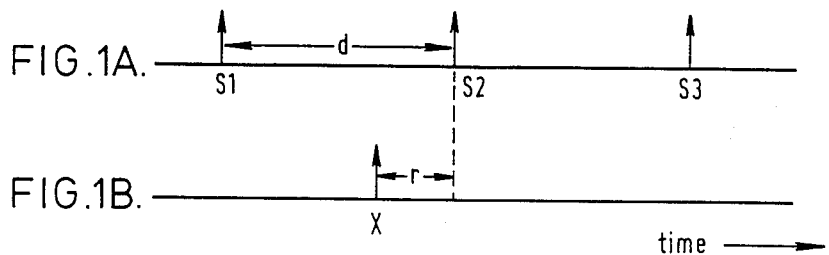
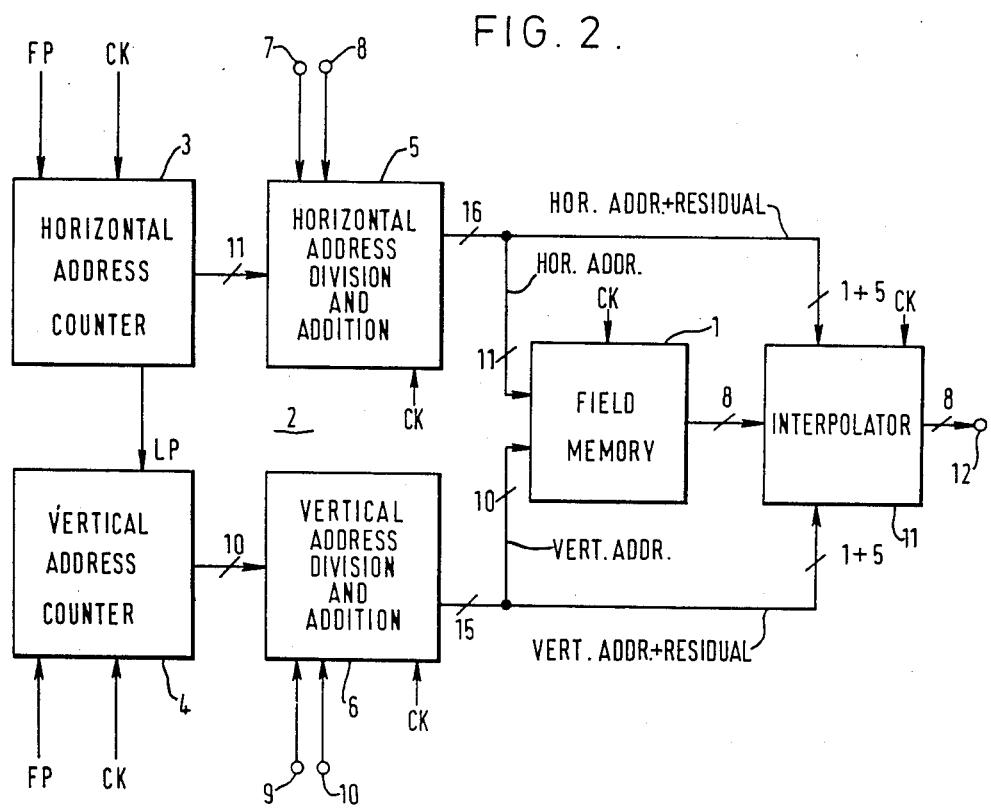

SIGNAL INTERPOLATORS

BACKGROUND OF THE INVENTION

1. Field of the Invention

This invention relates to signal interpolators, and more particularly, to signal interpolators for time base expanding a portion of an input sample signal and deriving interpolated output sample values.

The need for such a signal interpolator arises, for example, in video special effects equipment. The special effects which can be applied to a video signal are well known. Thus, for example, images on a cathode ray tube can be off-set (moved in any direction), scaled (expanded or compressed in size), rolled (rotated in two or three dimensions) and so on. One way of achieving these special effects involves converting an input analog video signal into digitized sample values each having a pixel address, modifying the resulting individual pixel addresses to achieve the required special effect, storing the sample values at the modified pixel addresses in a field memory, and reading from the field memory to derive the sample values for reconversion into the required output analog signal.

In the particular case of scaling, where the image is to be expanded, signal interpolation is required. That is to say, an input sequence (or in two dimensions an input array) of sample values at a given system sample rate needs to be time base expanded. In other words, new sample values need to be calculated and interpolated, so that in effect the sample rate is increased, although the output sample rate is still equal to the system sample rate.

2. Description of the Prior Art

One way of doing this is to convert the digital sample values back to an analog signal and re-sample the analog signal at the new higher sample rate, but this involves substantial hardware, and also difficult filtering problems. Alternatively, if the input sample rate is N and the output sample rate is M, then in theory the required output could be derived by multiplying the sample rate of the input signal by M and then dividing by N. In practice, the product M×N is likely to become excessively high, and also there are again difficult filtering problems.

Another alternative is disclosed in Canadian patent specification No. CA-A-1 186 751 and comprises determining the instantaneous time difference between input and output sample times, producing a control signal representative of that difference, and controlling the sample rate translation in dependence on the control signal. This Canadian specification is concerned solely with audio signals, and the method disclosed is not suitable for application to video signals, in particular because of the two dimensional nature of video signals, whereas audio signals are essentially one dimensional. Nor is the disclosure in this Canadian specification appropriate to deal with other problems which arise in connection with video signals; in particular the possibility that the expansion required may approach infinity, and the need to dispense with redundant information.

SUMMARY OF THE INVENTION

One object of the present invention is to provide an improved signal interpolator suitable for time base expanding a portion of an input sample signal.

Another object of the present invention is to provide an improved signal interpolator suitable for time base expanding a portion of an input sample array corresponding to a portion of an image which is to be expanded.

Another object of the present invention is to provide a signal interpolator for time base expanding a portion of an input sample signal of given sample rate by deriving, from said input sample values, interpolated output sample values at said sample rate, the signal interpolator comprising am address generator and an interpolator.

According to the present invention there is provided a signal interpolator for time base expanding a portion of an input sample signal of given sample rate by deriving, from said input sample values, interpolated output sample values at said sample rate, the signal interpolator comprising: an address generator comprising:

an address counter for supplying a sequence of initial sample position addresses at said sample rate and corresponding to input sample values in asid input sample signal; and means for deriving, from said initial addresses, a modified sequence of sample position addresses at said sample rate, said modified sequence containing address repetitions corresponding to the required degree of expansion, and also for deriving residual signals corresponding to subdivisions of the intervals between successive different addresses in said modified sequence; and an interpolator for deriving each said interpolated output sample value in dependence on the value of a said residual signal and of a respective corresponding group of said input sample values.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 1A and 1B show diagrammatically the relationship between input and output samples;

FIG. 2 shows in block form an embodiment of signal interpolator according to the present invention.

DESCRIPTION OF THE PREFERRED EMBODIMENT

Figure 3:
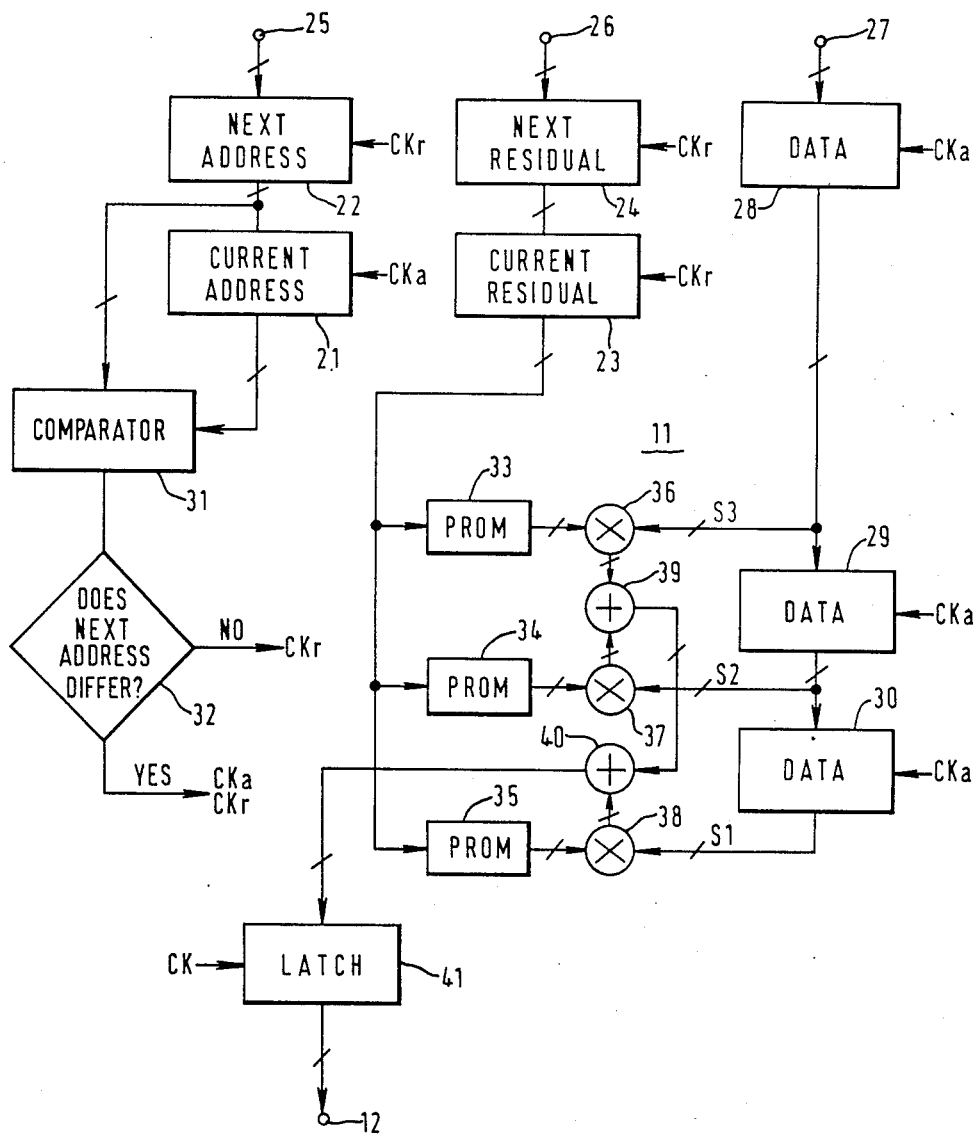
FIG. 3 shows in more detailed block form part of the embodiment of FIG. 2.

The need was referred to above for signal interpolation in, for example, video special effects equipment. Consider a recently proposed high definition video system using 1125 lines per frame and 60 fields per second, and having an aspect ratio of 5:3. In converting the video signal of such a system to digital form for special effects manipulation, the luminance information (and in a similar manner the chrominance information) contained in the input analog signal is sampled and the resulting samples are pulse code modulation coded. In the horizontal direction each scan line is sampled 2048 times, and in the vertical direction each frame is effectively sampled 1125 times due to the horizontal line structure. In digital form, therefore, each field can be considered as an array of 2048×1125/2 pixel addresses, each in digital form, with a sample value also in digital form associated with each pixel address.

Considering for simplicity just one horizontal scan line, suppose that a three-fold linear expansion is required and that the middle third of the input scan line has been selected for expansion. Thus, the sample values corresponding to the beginning and end thirds of the scan line are redundant, and the sample values corresponding to the middle third of the scan line have to be increased in sample rate by a factor of three; that is two new sample values have to be interpolated between each input sample value. However, it is to be noted that although the sample rate is in effect increased by a factor of three, the actual sample positions, or pixel addresses, are the same in the output scan line as in the input scan line, because the system sample rate remains the same. Such an expansion will generally, but not necessarily, be accomplished by a similar three-fold linear expansion in the vertical direction, so the area expansion is nine-fold.

In general, a signal interpolator used for this purpose must not only change the rate at which the data is clocked, but must also filter the output data to remove the high frequency components which are introduced by this process. A problem with this is that as the ratio of the effective output sample rate to the input sample rate increases, the characteristics that the filter is required to have change, so in practice the filter required becomes very complex. In the embodiment of signal interpolator to be described, these two functions of changing the effective sample rate and of filtration are combined by arranging that the signal interpolator contains relevant data at valid sample intervals, and also a value which represents the distance between these sample intervals in terms of the output.

This will now be further explained with reference to FIG. 1 which shows a one-dimensional example using a three-tap interpolator or digital filter. FIG. 1 shows three input sample values S1, S2 and S3, which are regularly spaced with time intervals d between them. FIG. 1B shows an output sample value X which precedes the input sample value S2 by a time interval r. The output sample value X may be anywhere in a range corresponding to the time interal d, depending on the required time base expansion.

The value of r/d can be used to determine coefficients to weight the input sample values S1, S2 and S3, and so generate the output sample value X, regardless of the absolute value of r or d. Since the output sample rate and hence the output filter characteristics are fixed, the input samples S1, S2 and S3 could in theory be used to generate an infinite sequence of output sample values. In practice, however, r is one of a finite number of subdivisions of d and so defines the number of unique output sample values which may be interpolated from the input sample values S1 to S3. However, it is to be noted that although the number of unique output sample values is limited, if the number of sub-divisions of d is greater than this limited number, repetitions will occur and the signal interpolator will continue to produce good, although non-ideal, interpolated sample values.

This will now be described with reference to FIG. 2 which shows in block form an embodiment of signal interpolator according to the present invention. The circuit includes a field memory 1 in the form of a random access memory (RAM) having n store locations corresponding respectively to the pixel addresses of one field of a television signal, at which, it is assumed, input sample values corresponding to one field and supplied at the system sample rate, have been stored. Horizonal and vertical addresses for reading from the field memory 1 are generated by an address generator 2. The address generator 2 comprises a horizontal address counter 3 which is driven by a system clock signal CK of frequency equal to the system sample rate to produce initial 11-bit horizontal addresses which cycle through the range 0 to 2047, corresponding to the number of samples in a horizontal scan line. The address generator 2 also comprises a vertical address counter 4 which is driven by the system clock signal CK to produce initial 10-bit vertical addresses which cycle through the even and odd ranges 0 to 1124 and 1 to 1125 successively, corresponding to the interlaced even and odd scan lines. To maintain frame synchronism, a frame pulse FP is supplied to each of the horizontal and vertical address counters 3 and 4, and to maintain line synchronism, a line pulse LP is supplied from the horizontal address counter 3 to the vertical address counter 4.

The address generator 2 also comprises a horizontal address division and addition device 5 to which the initial horizontal addresses are supplied by the horizontal address counter 3, and a vertical address division and addition device 6 to which the initial vertical addresses are supplied by the vertical address counter 4. The horizontal division and addition device 5 has two input control terminals 7 and 8 to which are respectively applied a variable horizontal divide ratio control signal and a variable horizontal offset control signal, while the vertical division and addition device 6 has two input control terminals 9 and 10 to which are respectively supplied a variable vertical divide ratio control signal and a variable vertical offset control signal. To maintain synchronism, the system clock signal CK is supplied to each of the horizontal and vertical division and addition devices 5 and 6.

The horizontal and vertical division and addition devices 5 and 6 respectivley supply modified sequences of 11-bit horizontal addresses and modified sequences of 10-bit vertical addresses, controlled by the signals supplied to the input control terminals 7 to 10, to the field memory 1, to which is also supplied the system clock signal CK. 8-bit sample data read out from the field memory 1, and hereinafter referred to as input data, are supplied to an interpolator 11, which supplies 8-bit output data to an output terminal 12. The clock signal CK is also supplied to the interpolator 11.

Considering for a moment the horizontal division and addition device 5, the division function firstly has the effect of converting each received initial 11-bit horizontal address into a 16-bit horizontal address. In other words, the address rate is increased by a factor $2^5$ or 32, so that effectively the 11-bit horizontal addresses, viewed as a succession of positions along a horizontal scan line, are each sub-divided into thirty-two such positions. Of each 16-bit horizontal address, the first, or most significant, eleven bits are supplied to the field memory 1, and the remaining, or least significant, five bits, referred to as the horizontal residual, plus at least the least significant bit of the 11-bit horizontal address, are supplied to theinterpolator 11. Secondly, under control of the horizontal divide ratio control signal supplied to the input control terminal 7, the division function has the effect of retiming the 11-bit horizontal addresses to a rate corresponding to the required degree of expansion. For example, if a two-fold linear expansion is required, the 11-bit horizontal address rate is halved, that is, the least significant bit of the 11-bit horizontal addresses changes at one-half the system sample rate. Likewise, the vertical division and addition device 6 supplies 10-bit vertical addresses to the field memory 1, and 5-bit vertical residuals to the interpolator 11, plus at least the least significant bit of the 10-bit vertical address.

Again, considering the horizontal division and addition device 5, the addition function has the effect of offsetting the modified sequence of 11-bit horizontal addresses supplied by the horizontal division and addition device 5 to the field memory 1, relative to the sequence of initial horizontal addresses supplied by the horizontal address counter 3 to the horizontal division and addition device 5. This offsetting is under control of the horizontal offset control signal supplied by way of the input control terminal 8. Suppose, for example, that a two-fold linear expansion is required, and that it is the right-hand side of the image that is to be expanded. In this case, the horizontal offset control signal will have the effect of making the modified sequence of horizontal addresses supplied by the horizontal division and addition device 5 in respect of each scan line start with the horizontal address corresponding to the sample position 1024, rather than the sample position 0, that is starting halfway along the scan line. Likewise, the vertical offset control signal supplied by way of the input control terminal 10 to the vertical division and addition device 6 causes offsetting of the modified sequence of 10-bit vertical addresses supplied by the vertical division and addition device 6 to the field memory 1 relative to the sequence of initial vertical addresses supplied by the vertical address counter 4 to the vertical division and addition device 6.

The operation of the signal interpolator will now be described in more detail, taking first the horizontal division and addition device 5. Suppose that the successively sample position addresses along a scan line are 0, 1, 2, ... 2047; that the horizontal divide ratio control signal is requesting a twofold linear expansion of that scan line; and that the horizontal offset control signal is requesting that the portion of the scan line selected for expansion starts f (where f is less than 1024) sample positions along the scan line. Then, since the field memory 1 must receive horizontal addresses at the rate of the system clock signal CK, the actual modified sequence of 11-bit horizontal addresses which the horizontal division and addition device 5 supplies in respect of that expanded scan line must be f, f, f+1, f+1, f+2, ... f+1024, f+1024. In this simple example of two-fold expansion, each horizontal address is repeated twice, but it will be seen that if the expansion is by a non-integral multiple, then some of the 11-bit horizontal addresses will be repeated more often than the others, because in each case the horizontal address supplied is merely the first eleven bits of a more precise 16-bit horizontal address, and the 11-bit horizontal address supplied will change when the eleventh bit of the 16-bit address changes. Moreover, between each change in the 11-bit horizontal address supplied, the horizontal residual will cycle through the thirty-two possible values determined by the five bits thereof. The vertical division and addition device 6 operates similarly.

The interpolator 11 is generally similar to the interpolators used in television standards converters, with the difference that the interpolator 11 must additionally select the sample values to be used in the calculations of the interpolated sample values. Briefly, the interpolator 11 holds an array of sample values comprising successive correspondingly-positioned sample values derived form a plurality of successive scan lines in a field, from which an interpolated sample value to be used at an interpolated position within that array, when the array is expanded in one or two dimensions, can be calculated. The necessary calculation comprises multiplying each sample value in the array by a weighting coefficient, and then adding the multiplied values so obtained. The necessary weighting coefficients are derived from look-up tables, which are held in one or more programmable read-only memories (PROMs), selection of the appropriate weighting coefficients from the PROMs being under control of the horizontal and vertical residuals. If, for example, the array of sample values corresponds to three-by-three sample positions, then it is convenient to provide nine multipliers each with a respective associated PROM holding the corresponding look-up table. The actual number of sample positions in the array determines the accuracy of the interpolation, and more accurate interpolation can be achieved by using, for example, a four-by-three or a four-by-four array.

As a simple example, FIG. 3 shows an interpolator 11 where just three successive sample values from a single horizontal scan line are used for calculating the interpolated sample values. In other words, this interpolator 11 does not use a two-dimensional array of sample values, and so permits expansion in one dimension only, in particular in the horizontal direction.

The interpolator 11 comprises address latch circuits 21 and 22 which respectively hold at least the least significant bit of the currently supplied 11-bit horizontal address and of the next supplied 11-bit horizontal address. and residual latch circuits 23 and 24 which respectively hold the currently supplied 5-bit horizontal residual and the next supplied 5-bit horizontal residual. The required addresses and residuals are supplied by way of input terminals 25 and 26, respectively, while succesive 8-bit data sample values are supplied by way of an input terminal 27 to series-connected data latch circuits 28, 29 and 30.

The address latch circuits 21 and 22 are connected to a comparator circuit 31 which at the frequency of the residuals compares the current and next addresses to see if there has been any change, which, it will be noted, only actually requires the least significant bits of the 11-bit horizontal addresses to be held in the addresses latch circuits 21 and 22, and in dependence on the comparison controls the supply of a clock pulse signal CKr and a clock pulse signal CKa, as indicated by the control 32, to the lach circuits 21 to 24 and 28 to 30.

The latch circuit 23 is connected to PROMs 33, 34 and 35 which hold the look-up tables referred to above. The outputs of the PROMs 33, 34 and 35 are connected to respective multipliers 36, 37 and 38, which also receive inputs from the data latch circuits 28, 29 and 30 respectively. The multipliers 36 and 37 supply outputs to an adder 39, the output of which is supplied to an adder 40 which also receives an output signal supplied by the multipler 38, the output of the adder 40 being supplied by way of an output latch circuit 41 to the output terminal 12.

If, for example, the data latch circuits 30, 29 and 28 are holding respectively sample values S1, S2 and S3, then at the frequency of the clock signal CKr the adder 40 will supply successive different interpolated sample values to the output latch circuit 41. However, as the output latch circuit 41 is clocked at the system sample rate by the system clock signal CK, only the interpolated sample values corresponding to the required output addresses are supplied to the output terminal 12 and they are supplied at the system sample rate.

Expansion of this simple interpolator 11 to use an array of sample values basically involves the replacement of each latch circuit 28, 29 and 30 by a line store; the other consequential modifications being readily apparent to those skilled in the art.

Because of the repetition of horizontal and/or vertical addresses which occurs when there is expansion in the horizontal and/or vertical direction, the sample values read from the field memory 1 into the interpolator 11 to be held in the array will change relatively slowly. However, it will be realised that even where there is substantial expansion, so that the sample values held in the array in the interpolator 11 do not change, for example, for an appreciable fraction of a field interval, the horizontal and vertical residuals will nevertheless continue to change during this interval, so the unchanging sample values held in the array will nevertheless give rise to changing output data. Such changes in the output data are of course limited to the maximum number of different values which the horizontal and vertical residuals can have, this being thirty-two in the present case. Thus, if the expansion is greater than thirty-two-fold, there will be repetitions of interpolated sample values in the output data, but these repeated values will be good approximations to the precisely correct values. Greater accuracy could of course be achieved by increasing the number of bits in the horizontal and vertical residuals.

Although described in relation to interpolation of a video signal, it will be understood that embodiments of the invention can similarly be used for interpolation of other input sample signals, and in particular can be used where the input sample signal can be represented by one-dimensional addresses, rather than the two-dimensional addresses required for a video signal.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope and spirit of the invention as defined by the appended claims.

I claim:

1. A signal interpolator for time base expanding a portion of an input sample signal of given sample rate by deriving, from said input sample values, interpolated output sample values at said sample rate, the signal interpolator comprising:

an address generator comprising:
an address counter for supplying a sequence of initial sample position addresses at said sample rate and corresponding to input sample values in said input sample signal; and
means for deriving, from said initial addresses, a modified sequence of sample position addresses at said sample rate, said modified sequence containing address repetitions corresponding to the required degree of expansion, and also for deriving residual signals corresponding to subdivisions of the intervals between successive different addresses in said modified sequence; and
an interpolator for deriving each said interpolated output sample value in dependence on the value of a said residual signal and of a respective corresponding group of said input sample values.

2. A signal interpolator according to claim 1 wherein each said residual signal comprises the less significant bits of a more precise address derived from a said initial address, the more significant bits of each said precise address forming an address in said modified sequence, and said initial address and said addresses in said modified sequence having equal numbers of bits.

3. A signal interpolator according to claim 1 for an input video sample signal, wherein said address generator comprises a first said address counter for supplying horizontal said initial addresses and a second said address counter for supplying vertical said initial addresses, and said means derives horizontal and vertical said modified sequences and horizontal and vertical residual signals, and wherein said sample rate is the video system sample rate.

4. A signal interpolator according to claim 3 wherein said means also offsets the addresses in said horizontal and vertical modified sequences, for the purpose of selecting for expansion a required portion of an image corresponding to said video signal.

5. A signal interpolator according to claim 3 further comprising a field memory to which said input sample values are supplied, and wherein said interpolator is supplied with an array of read-out input sample values from said field memory to form said group.

6. A signal interpolator according to claim 3 wherein said interpolator comprises memory means holding look-up tables comprising sets of weighting coefficients, a said set of weighting coefficients being derived from said memory means in response to each said residual, multiplier means for multiplying each said sample value of said array by a respective said weighting coefficient of a said set of weighting coefficients, and adder means for summing the resulting multiplied values to form a said interpolated output sample value.

7. A signal interpolator according to claim wherein each said array of sample values comprises successive correspondingly-positioned sample values derived from a plurality of successive horizontal scan lines.

* * * * *